(12) United States Patent
Nakamura

(10) Patent No.: US 8,707,025 B2
(45) Date of Patent: Apr. 22, 2014

(54) COMMUNICATION APPARATUS MEDIATING COMMUNICATION BETWEEN INSTRUMENTS

(75) Inventor: Mitsunori Nakamura, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 211 days.

(21) Appl. No.: 12/868,830

(22) Filed: Aug. 26, 2010

(65) Prior Publication Data

US 2011/0055557 A1 Mar. 3, 2011

(30) Foreign Application Priority Data

Aug. 28, 2009 (JP) ................................. 2009-198388

(51) Int. Cl.
*H04L 29/06* (2006.01)
*H04L 9/32* (2006.01)

(52) U.S. Cl.
CPC ................................. *H04L 63/0823* (2013.01)
USPC .......................................... 713/156; 713/175

(58) Field of Classification Search
CPC .................................................... H04L 63/0823
USPC ................................................ 713/156, 175
See application file for complete search history.

(56) References Cited

U.S. PATENT DOCUMENTS

| 7,734,910 | B2 | 6/2010 | Nasu |
| 2003/0018753 | A1 | 1/2003 | Seki |
| 2003/0055990 | A1* | 3/2003 | Cheline et al. ................ 709/229 |
| 2003/0084311 | A1* | 5/2003 | Merrien et al. ............... 713/191 |
| 2004/0177246 | A1* | 9/2004 | Balaz et al. .................... 713/151 |
| 2004/0243805 | A1* | 12/2004 | Enokida ......................... 713/175 |
| 2004/0243994 | A1* | 12/2004 | Nasu ............................... 717/171 |
| 2005/0033957 | A1* | 2/2005 | Enokida ......................... 713/156 |
| 2006/0015746 | A1* | 1/2006 | Kusudo et al. ................ 713/187 |
| 2006/0143702 | A1* | 6/2006 | Hisada et al. ................... 726/15 |
| 2006/0182042 | A1 | 8/2006 | Nasu |
| 2006/0282662 | A1* | 12/2006 | Whitcomb .................... 713/156 |

(Continued)

FOREIGN PATENT DOCUMENTS

| JP | 2001-249899 A | 9/2001 |
| JP | 2003-030072 A | 1/2003 |

(Continued)

OTHER PUBLICATIONS

Press Release "Ricoh globally develops remote management service "@Remote" supporting operational management about two million digital multi-function peripherals/printers worldwide in 2007", Dec. 12, 2004, 2 pps., http://www.ricoh.co.jp/release/by_field/other/2004/1210.html, with partial translation.

(Continued)

*Primary Examiner* — Techane Gergiso
(74) *Attorney, Agent, or Firm* — Buchanan Ingersoll & Rooney PC

(57) ABSTRACT

A communication apparatus makes a request to issue an electronic certificate of a first instrument to a certificate authority and acquires the electronic certificate from the certificate authority. The communication apparatus communicates with a second instrument using the electronic certificate of the first instrument in response to reception of a request for communication with the second instrument from the first instrument. Therefore, the communication apparatus mediates information communication between the second instrument and the first instrument.

20 Claims, 14 Drawing Sheets

(56) References Cited

U.S. PATENT DOCUMENTS

| | | |
|---|---|---|
| 2007/0192836 A1* | 8/2007 | Shiran et al. .................. 726/4 |
| 2007/0226793 A1* | 9/2007 | Tanabiki et al. ................ 726/21 |
| 2009/0100261 A1* | 4/2009 | Aoshima ....................... 713/155 |
| 2010/0049970 A1* | 2/2010 | Fraleigh et al. ............... 713/156 |
| 2010/0228968 A1* | 9/2010 | Wason et al. .................. 713/156 |

FOREIGN PATENT DOCUMENTS

| | | |
|---|---|---|
| JP | 2003-231086 A | 8/2003 |
| JP | 2004-320715 A | 11/2004 |
| JP | 2005-260759 A | 9/2005 |
| JP | 2006-260530 A | 9/2006 |
| JP | 2007-305052 A | 11/2007 |
| JP | 2008-287587 A | 11/2008 |

OTHER PUBLICATIONS

Office Action from the Japan Patent Office dated Oct. 22, 2013, issued in corresponding Japanese Patent Application No. 2009-198388, with English translation thereof. (6 pages).

* cited by examiner

COMMUNICATION APPARATUS MEDIATING COMMUNICATION BETWEEN INSTRUMENTS

This application is based on Japanese Patent Application No. 2009-198388 filed with the Japan Patent Office on Aug. 28, 2009, the entire content of which is hereby incorporated by reference.

BACKGROUND OF THE INVENTION

1. Field of the Invention

The present invention relates to communication in which an electronic certificate is used, particularly to a communication apparatus that mediates communication using the electronic certificate, a communication method, a communication program, and a communication system.

2. Description of the Related Art

Conventionally, various techniques of communicating with an inside device from the outside through a network such as the Internet are studied in order to remotely maintain an inside server. In the communication, there is a need for a countermeasure that prevents leakage or tampering of information used in the communication or information accumulated in the device. The communication in which an electronic certificate is used can be cited as an example of the countermeasure.

Japanese Laid-Open Patent Publication No. 2001-249899 discloses a technique in which an upper-level instrument having interface means to an external network is placed in a local network belonging to a control target instrument. In the technique, the upper-level instrument transmits information authenticating the control target instrument to a service center on the external network. When the service center authenticates the control target instrument, the service center and the control target instrument directly conduct encrypted communication.

Press Release "Ricoh globally develops remote management service "@Remote" supporting operational management about two million digital multi-function peripherals/printers worldwide in 2007", Dec. 12, 2004, http://www.ricoh.co.jp/release/by_field/other/2004/1210.html discloses a technique in which the inside server mediates communication between the inside control target instrument and a technical call center that collects information for maintenance of the control target instrument. In the technique, the inside server communicates with control target instrument through a LAN (Local Area Network), thereby conducting the encrypted communication with the outside technical call center using the electronic certificate.

In the technique disclosed in Japanese Laid-Open Patent Publication No. 2001-249899, when the communication between the control target instrument and the service center is realized by key cryptography using the electronic certificate, it is necessary for the control target instrument to include information-processing ability to communicate using the electronic certificate. Accordingly, due to a so-called low-specification control target instrument, when the processing ability necessary for encode (encryption) and decode (decryption) for the communication in which the electronic certificate is used runs short, or when the ability to authenticate the certificate of the other end runs short, the technique cannot be applied.

On the other hand, in the technique disclosed in Press Release, it is not necessary for the control target instrument to communicate in which the electronic certificate is used. Accordingly, the technique can be applied when the inside server has the processing ability even if the control target instrument does not have the processing ability.

However, in the technique, when communicating with the technical call center, the inside server uses the electronic certificate of the inside server, but not the electronic certificate of the control target instrument that becomes the target of data collection performed by the technical call center. Therefore, the technical call center cannot confirm validity of the control target instrument that is of the target of the maintenance during the maintenance of the control target instrument.

SUMMARY OF THE INVENTION

In view of the foregoing, an object of the invention is to be able to confirm the validity of the control target instrument by the instrument that communicates with the control target instrument even if the control target instrument does not have the information-processing ability necessary for the communication in which the electronic certificate is used in the communication system.

The present invention provides a communication apparatus including: a communication unit that communicates with a first instrument a second instrument, and makes a request to issue an electronic certificate of the first instrument to a certificate authority, and acquires the electronic certificate of the first instrument, the electronic certificate of the first instrument being issued by the certificate authority, and the communication unit communicates with the second instrument using the electronic certificate of the first instrument in response to a reception of a request for communication with the second instrument from the first instrument, whereby mediating information communication between the second instrument and the first instrument.

The present invention provides a communication method performed in a communication apparatus that communicates with a first instrument and a second instrument, the communication method includes the steps of: making a request to issue an electronic certificate of the first instrument to a certificate authority; acquiring the electronic certificate of the first instrument, the electronic certificate of the first instrument being issued by the certificate authority; and communicating with the second instrument using the electronic certificate of the first instrument in response to reception of the request for the communication with the second instrument from the first instrument, whereby mediating information communication between the second instrument and the first instrument.

The present invention provides a computer-readable recording medium being a recording medium in which a program is recorded, the program being able to be executed by a computer in order to communicate with a first instrument and a second instrument, wherein the program includes a program code that causes the computer to perform the steps of: making a request to issue an electronic certificate of the first instrument to a certificate authority; acquiring the electronic certificate of the first instrument, the electronic certificate of the first instrument being issued by the certificate authority; and communicating with the second instrument using the electronic certificate of the first instrument in response to reception of the request for the communication with the second instrument from the first instrument, whereby mediating information communication between the second instrument and the first instrument.

The present invention provides a communication system includes a first instrument, a second instrument, a certificate authority, and a communication apparatus, wherein the communication apparatus includes a communication unit that communicates with the first instrument and the second instrument, and makes a request to issue an electronic certificate of the first instrument to the certificate authority. The certificate authority transmits the electronic certificate of the first instrument to the communication unit based on the request received from the communication unit. The communication unit acquires the electronic certificate of the first instrument, the electronic certificate of the first instrument being issued by the certificate authority. The communication unit communicates with the second instrument using the electronic certificate of the first instrument in response to a reception of a request for communication with the second instrument from the first instrument, whereby mediating information communication between the second instrument and the first instrument.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the invention will be described below with reference to the drawings. In the following drawings, the same element is designated by the same numeral, and the detailed description is not repeated.

First Embodiment (Outline of Communication System)

Figure 1:
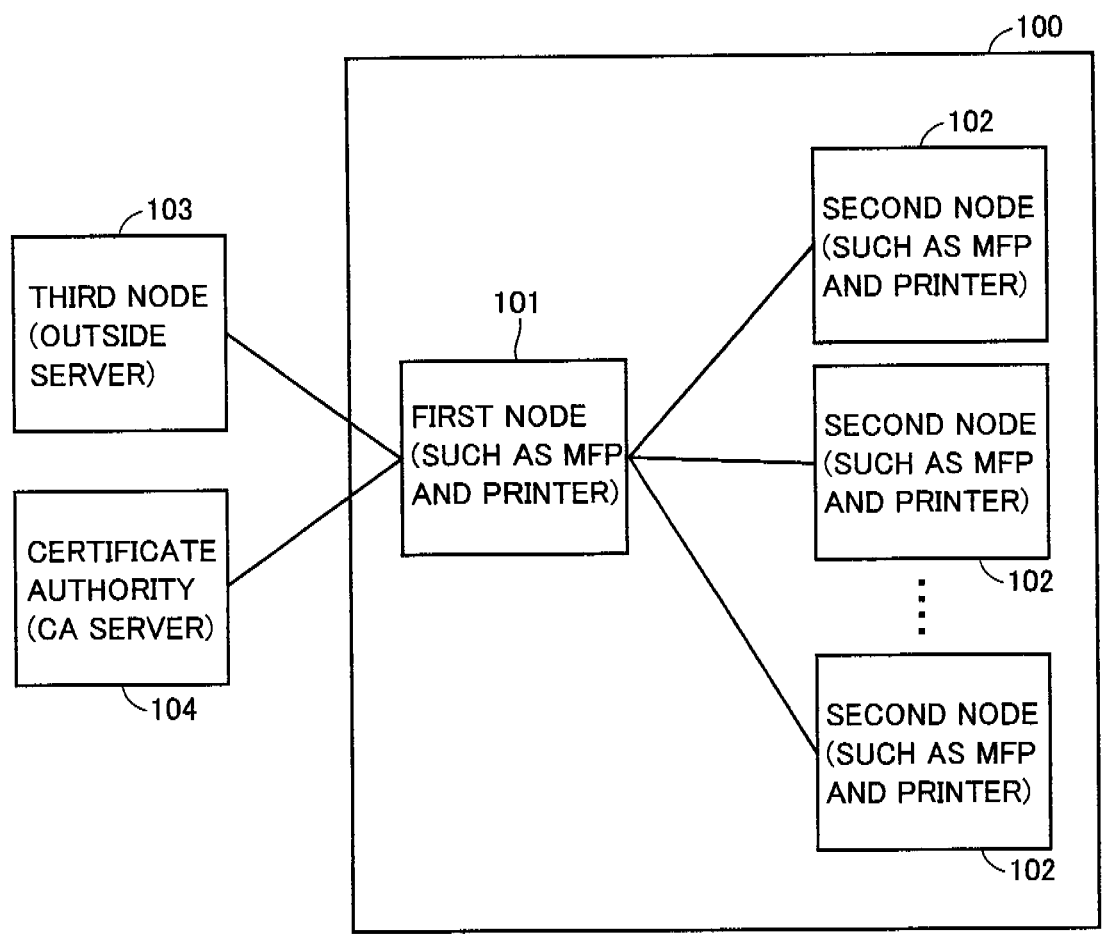
FIG. 1 schematically illustrates a configuration of a communication system according to a first embodiment of the invention.

FIG. 1 schematically illustrates a configuration of a communication system according to a first embodiment of the invention.

Referring to FIG. 1, the communication system of the first embodiment includes a first node 101 that exists in a network 100 such as a LAN and a second node 102 that is connected to first node 101. In network 100, it is assumed that a plurality of second nodes 102 are connected to first node 101.

In the communication system of the first embodiment, first node 101 can be connected to a certificate issuing authority 104 and a third node 103, which exist outside of network 100.

In the first embodiment, first node 101 acquires an electronic certificate of second node 102 by proxy of second node 102 from certificate issuing authority 104. First node 101 communicates with third node 103 using the electronic certificate of second node 102, thereby mediating the communication between second node 102 and third node 103.

In the communication system of the first embodiment, third node 103 and certificate issuing authority 104 are described as a separate device. Alternatively, third node 103 and certificate issuing authority 104 may be formed by the same instrument.

As described later, first node 101 has a function of acquiring the electronic certificate of second node 102 by proxy and a function of mediating the communication with third node 103. The functions may be realized by a single instrument like first node 101 of the first embodiment, or each function may be realized by an individual instrument (physically-separated instrument).

In the first embodiment, first node 101 constitutes a communication apparatus that acquires the electronic certificate of the control target instrument by proxy. Second node 102 constitutes the control target instrument. Third node 103 constitutes the external instrument that communicates with the control target instrument with the communication instrument as the mediation. Certificate issuing authority 104 constitutes the certificate issuing device.

(Configuration of First Node 101)

In order to perform at least the following processing contents, first node 101 includes a processor that performs calculation or processing of information and includes a CPU (Central Processing Unit) or the like, a hardware resource that realizes a later-described communication function of a communication unit 201 for the second node, and a storage device that realizes a second node information management unit 202 and the like.

The functions realized by first node 101 will be described with reference to FIG. 2 that is of a functional block diagram of first node 101.

(Function of Acquiring Electronic Certificate by Proxy in First Node 101)

The function in which first node 101 acquires the electronic certificate of second node 102 by proxy of second node 102 from certificate issuing authority 104 will be described below.

Figure 2:
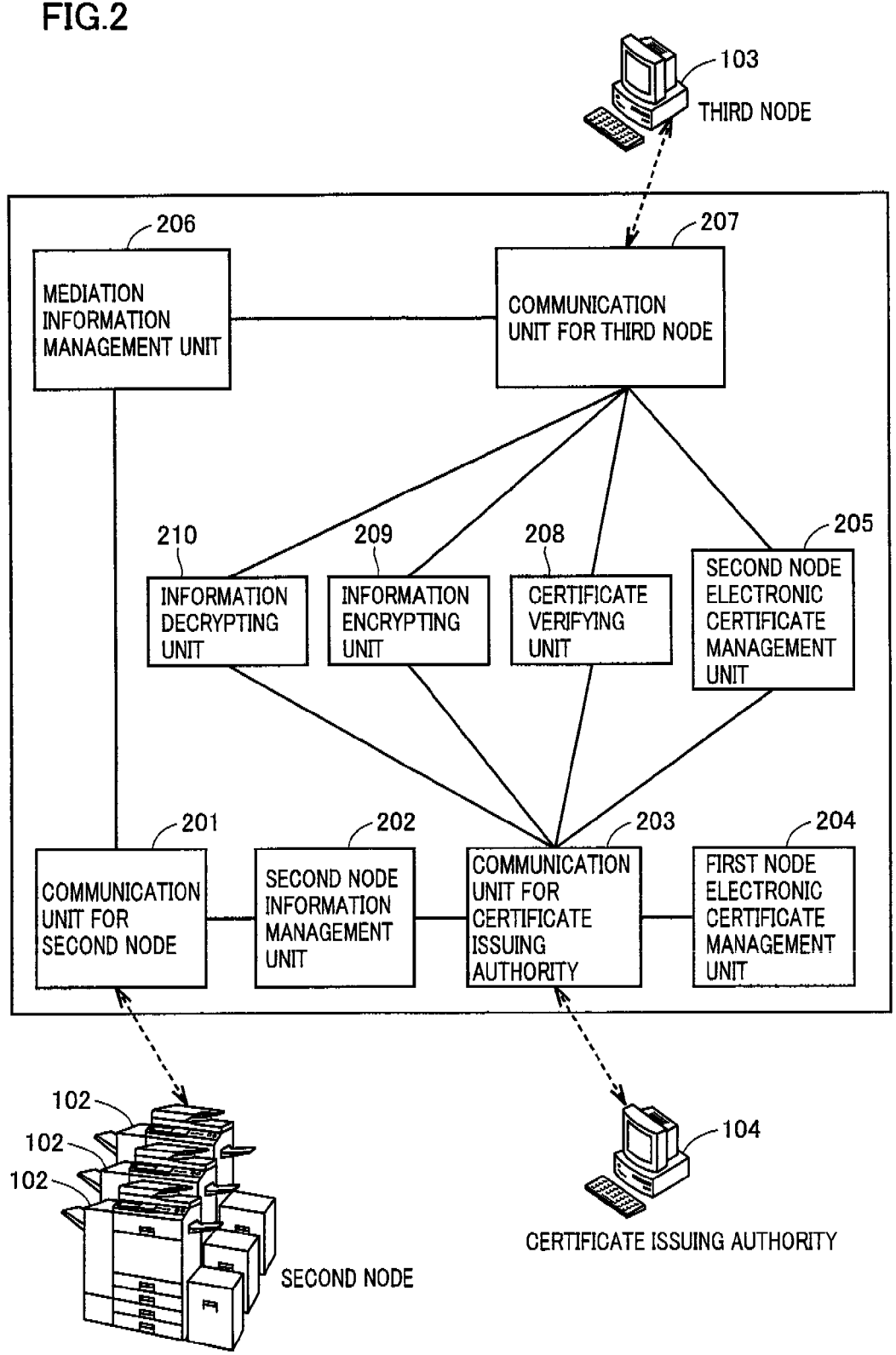
FIG. 2 is a functional block diagram of a first node of FIG. 1.

Referring to FIG. 2, in first node 101, communication unit 201 (hereinafter simply referred to as "communication unit 201") for the second node receives information (information for specifying one of the plurality of second nodes 102, hereinafter appropriately referred to as "second node information") specifying second nodes 102, such as a serial number transmitted from second nodes 102 and stores the information in second node information management unit 202 (hereinafter simply referred to as "management unit 202").

When storing the second node information in management unit 202, communication unit 201 may be configured to confirm that second node 102 exists on the same network (network 100) as first node 101 by confirming an IP (Internet Protocol) address or an MAC (Media Access Control) address of second node 102 and communication pathway information. In such cases, communication unit 201 may be configured not to communicate with second node 102 when second node 102 does not exist on the same network as first node 101.

First node 101 may be configured to be able to acquire the information from a storage device such as a memory card, an IC (Integrated Circuit) card, and a USB (Universal Serial Bus) memory. Communication unit 201 may acquire the second node information from the storage device.

When first node 101 includes an input device such as a keyboard and an operation panel, communication unit 201 may acquire the second node information based on an operation performed to the input device.

An expiration date that is of a deadline for first node 101 to apply for the issuance of the electronic certificate of second node 102 to certificate issuing authority 104 may be set to the second node information. At this point, first node 101 can make a request to issue the electronic certificate of second node 102 to certificate issuing authority 104 only within the expiration date.

A communication unit 203 (hereinafter simply referred to as "communication unit 203") for the certificate issuing authority acquires the electronic certificate of certificate issuing authority 104 from certificate issuing authority 104. A certificate verifying unit 208 verifies the electronic certificate. When certificate verifying unit 208 fails in the verification, communication unit 201 notifies second node 102 of the failure of the verification.

Communication unit 203 acquires the electronic certificate of first node 101 from a first node electronic certificate management unit 204 (hereinafter simply referred to as "management unit 204") and transmits the electronic certificate to certificate issuing authority 104. It is assumed that the electronic certificate of first node 101 is previously stored in management unit 204.

Communication unit 203 acquires verification result of the electronic certificate of first node 101 from certificate issuing authority 104. When certificate verifying unit 208 fails in the verification, communication unit 201 notifies second node 102 of the failure of the verification.

Communication unit 203 communicates with certificate issuing authority 104 using SSL (Secure Socket Layer). At this point, communication unit 201 may notify second node 102 of the success and failure of SSL handshake.

When communication unit 203 succeeds in the SSL handshake with certificate issuing authority 104, communication unit 203 reads the second node information from management unit 202, an information encrypting unit 209 encrypts the second node information by public key cryptography or common key cryptography, and communication unit 203 transmits the encrypted second node information to certificate issuing authority 104 to make a request to issue the electronic certificate of second node 102.

Communication unit 203 acquires the electronic certificate of second node 102, which is transmitted from certificate issuing authority 104, an information decrypting unit 210 decrypts the electronic certificate, and the electronic certificate is stored in a second node electronic certificate management unit 205 (hereinafter simply referred to as "management unit 205").

In the communication system of the first embodiment, the expiration date of the electronic certificate of second node 102 can be set so as to be expired before the expiration date of the electronic certificate of first node 101. Management unit 202 may set the expiration date of the electronic certificate of second node 102 by referring to the expiration date of the electronic certificate of first node 101, which is stored in management unit 204, or certificate issuing authority 104 may set the expiration date of the electronic certificate of second node 102 such that communication unit 203 transmits policy related to the expiration date when making a request to issue the electronic certificate of second node 102 to certificate issuing authority 104.

Communication unit 201 can notify second node 102 whether or not the electronic certificate of second node 102 is successfully acquired from certificate issuing authority 104 by an electronic mail or HTTP (Hyper Text Transfer Protocol) communication.

(Communication Mediation Function of First Node 101)

Communication unit 201 stores mediation communication data transmitted from second node 102 in a mediation information management unit 206. Communication unit 201 can confirm whether or not second node 102 exists on the same network as first node 101 by confirming the IP address or MAC address of second node 102 and the communication pathway information. Communication unit 201 may abort the communication with second node 102 when second node 102 does not exist on the same network as first node 101.

The communication data between first node 101 and second node 102 may be encrypted by the common key cryptography in order to prevent leakage or tampering of the data during the communication between first node 101 and second node 102.

The function of first node 101 in mediating the communication between second node 102 and third node 103 will be described below.

A communication unit 207 (hereinafter simply referred to as "communication unit 207") for the third node acquires the electronic certificate of third node 103 from third node 103, and certificate verifying unit 208 certificate verifying unit 208 verifies the electronic certificate of third node 103. When certificate verifying unit 208 fails in the verification, communication unit 201 notifies second node 102 of the failure of the verification.

Communication unit 207 acquires the electronic certificate of second node 102 from management unit 205 and transmits the electronic certificate to third node 103. Communication unit 207 acquires verification result of the electronic certificate of second node 102 from third node 103. When certificate verifying unit 208 fails in the verification, communication unit 201 notifies second node 102 of the failure of the verification.

First node 101 may transmit the electronic certificate of first node 101 to third node 103 in order that third node 103 is caused to authenticate first node 101 that mediates the communication with second node 102. In such cases, communication unit 207 acquires the verification result of the electronic certificate of first node 101 from third node 103. When certificate verifying unit 208 fails in the verification, communication unit 201 notifies second node 102 of the failure of the verification.

Communication unit 207 acquires communication data (data that is acquired from second node 102 in order to transmit the data to third node 103) from mediation information management unit 206, and information encrypting unit 209 encrypts the communication data by the public key cryptography or common key cryptography. Communication unit 207 transmits the encrypted data to third node 103.

Communication unit 207 acquires the encrypted data from third node 103, information decrypting unit 210 decrypts the encrypted data, and the decrypted data is stored in mediation information management unit 206.

Communication unit 201 reads the decrypted data from mediation information management unit 206 and transmits the decrypted data to second node 102.

In first node 101 described with reference to FIG. 2, different communication units (communication unit 201, 203, and 207) are prepared in each communication end. Alternatively, the communication units can be put together into one or two communication units.

(Configuration of Second Node 102)

Figure 3:
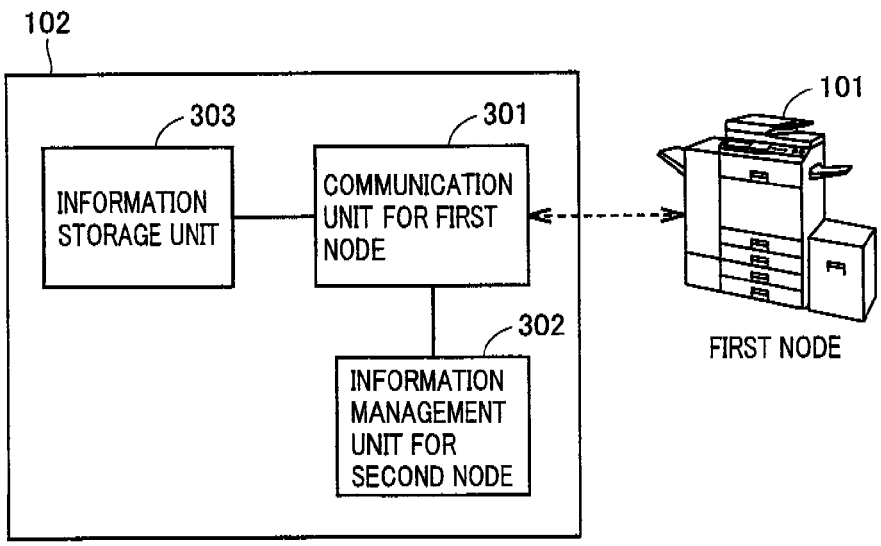
FIG. 3 is a functional block diagram of a second node of FIG. 1.

FIG. 3 illustrates a functional block of second node 102.

(Request to Acquire Electronic Certificate of Second Node by Proxy)

In order to perform at least the following processing contents, second node 102 includes a processor that performs the calculation or processing of information and includes a CPU (Central Processing Unit) or the like, a hardware resource that realizes a communication function of a communication unit 301 (hereinafter simply referred to as "communication unit 301") for the first node, and a storage device that realizes an information storage unit 303 and a second node information management unit 302 (hereinafter simply referred to as "management unit 302"). The functions realized by second node 102 will be described below with reference to FIG. 3.

In second node 102, communication unit 301 acquires information (second node information), such as a serial number, which can be used to specify second node 102 from management unit 302 and transmits the information to first node 101.

Communication unit 301 may add the IP address or MAC address of second node 102 and the communication pathway information to the second node information transmitted to first node 101. First node 101 can determine whether or not second node 102 exists on the same network as first node 101 based on the pieces of information.

(Mediation of Second Node)

Communication unit 301 receives the acquisition result of the electronic certificate of second node 102, which is transmitted from first node 101.

Communication unit 301 reads data, which is transmitted to third node 103, from information storage unit 303 and transmits the data to first node 101. Communication unit 301 may transmit the IP address or MAC address of second node 102 and the communication pathway information to first node 101 such that first node 101 can confirm that second node 102 exists on the same network as first node 101 in transmitting the data to first node 101.

Communication unit 301 may communicate with first node 101 by the common key cryptography in order to prevent the leakage or tampering of the data during the communication with first node 101.

(Configuration of Third Node 103)

Figure 4:
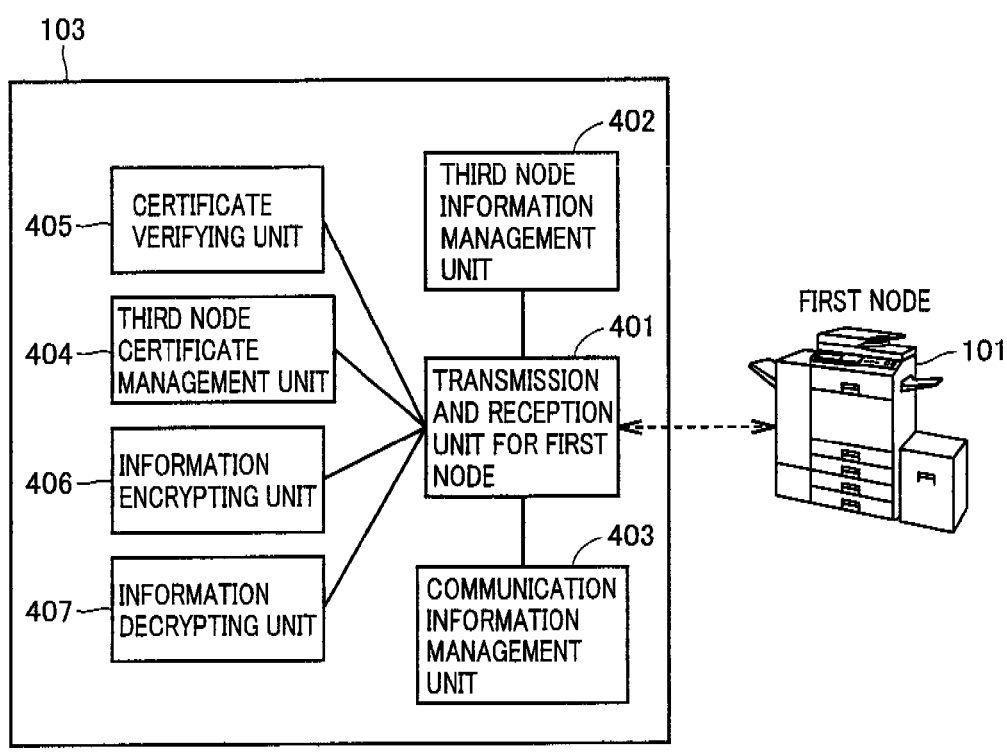
FIG. 4 is a functional block diagram of a third node of FIG. 1.

FIG. 4 illustrates a functional block of third node 103.

In order to perform at least the following processing contents, third node 103 includes a processor that performs the calculation or processing of information and includes a CPU or the like, a hardware resource that realizes a communication function of a transmission and reception unit 401 (hereinafter referred to as "transmission and reception unit 401") for the first node, and a storage device that realizes a third node information management unit 402 and the like. The functions realized by third node 103 will be described below with reference to FIG. 4.

In third node 103, transmission and reception unit 401 acquires the electronic certificate of third node 103 from a third node certificate management unit 404 (hereinafter simply referred to as "management unit 404") and transmits the electronic certificate to first node 101. Transmission and reception unit 401 acquires the verification result of the electronic certificate of third node 103 from first node 101.

Transmission and reception unit 401 acquires the electronic certificate of second node 102 transmitted from first node 101, and a certificate verifying unit 405 verifies the electronic certificate. Transmission and reception unit 401 transmits the verification result to first node 101.

When certificate verifying unit 405 succeeds in the verification, transmission and reception unit 401 receives data transmitted from first node 101, an information decrypting unit 407 decrypts the data, and transmission and reception unit 401 performs predetermined processing according to the decrypted data.

Transmission and reception unit 401 acquires data, which should be transmitted to first node 101 or second node 102, from a communication information management unit 403, an information encrypting unit 406 encrypts the data by the public key cryptography or common key cryptography, and transmission and reception unit 401 transmits the encrypted data to first node 101.

(Configuration of Certificate Issuing Authority 104)

Figure 5:
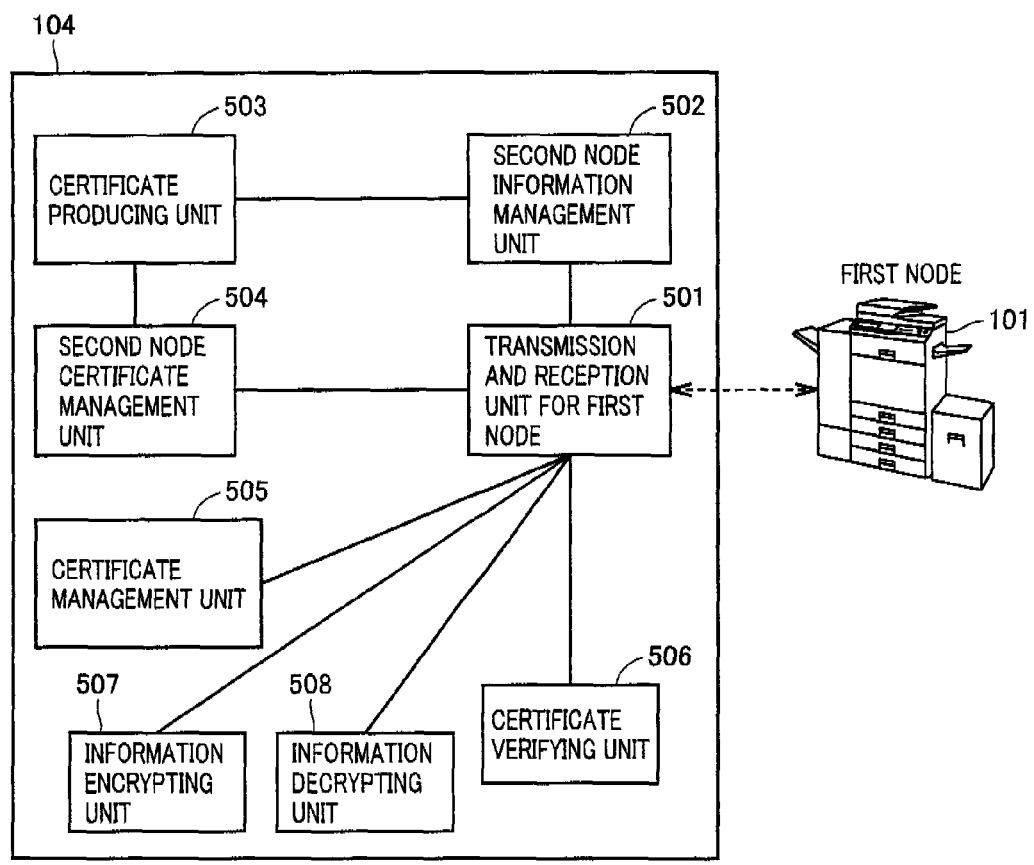
FIG. 5 is a functional block diagram of a certificate authority of FIG. 1.

FIG. 5 illustrates a functional block of certificate issuing authority 104.

In order to perform at least the following processing contents, certificate issuing authority 104 includes a processor that performs the calculation or processing of information and includes a CPU or the like, a hardware resource that realizes a communication function of a transmission and reception unit 501 (hereinafter simply referred to as "transmission and reception unit 501") for the first node, and a storage device that realizes a second node information management unit 502 (hereinafter simply referred to as "management unit 502") and the like. The functions realized by certificate issuing authority 104 will be described below with reference to FIG. 5.

In certificate issuing authority 104, transmission and reception unit 501 acquires the electronic certificate of certificate issuing authority 104 from a certificate management unit 505 (hereinafter simply referred to as "management unit 505"), transmits the electronic certificate to first node 101, and acquires the verification result of the electronic certificate of certificate issuing authority 104 from first node 101.

Transmission and reception unit 501 acquires the electronic certificate of first node 101 transmitted from first node 101, a certificate verifying unit 506 verifies the electronic certificate, and transmission and reception unit 501 transmits the verification result to first node 101.

When certificate verifying unit 506 succeeds in the verification, an information decrypting unit 508 decrypts the second node information, and transmission and reception unit 501 stores the second node information in management unit 502 (hereinafter simply referred to as "management unit 502").

Transmission and reception unit 501 may store the second node information in the above-described way subject to the existence of second node 102. Specifically, existence confirming data encrypted by the common key cryptography is transmitted to second node 102 by the electronic mail or HTTP communication, and the second node information may be stored in the above-described way subject to receiving reply data encrypted by the similar method from second node 102.

In such cases, the expiration date related to the transmission of the replay data may be provided in the existence confirming data.

A certificate producing unit 503 reads the second node information from management unit 502, produces the electronic certificate of second node 102 based on the second node information, and stores the produced electronic certificate in a second node certificate management unit 504 (hereinafter simply referred to as "management unit 504").

Certificate producing unit 503 can set the expiration date to the electronic certificate of second node 102. The expiration date can set so as to be expired before the expiration date of the electronic certificate of first node 101 that mediates the communication between second node 102 and an instrument located outside of network 100.

Transmission and reception unit 501 reads the electronic certificate of second node 102 from management unit 504, an information encrypting unit 507 encrypts the electronic certificate by the public key cryptography or common key cryptography, and transmission and reception unit 501 transmits the encrypted electronic certificate of second node 102 to first node 101.

(Processing in First Node during Acquisition of Certificate by Proxy)

Figure 6:
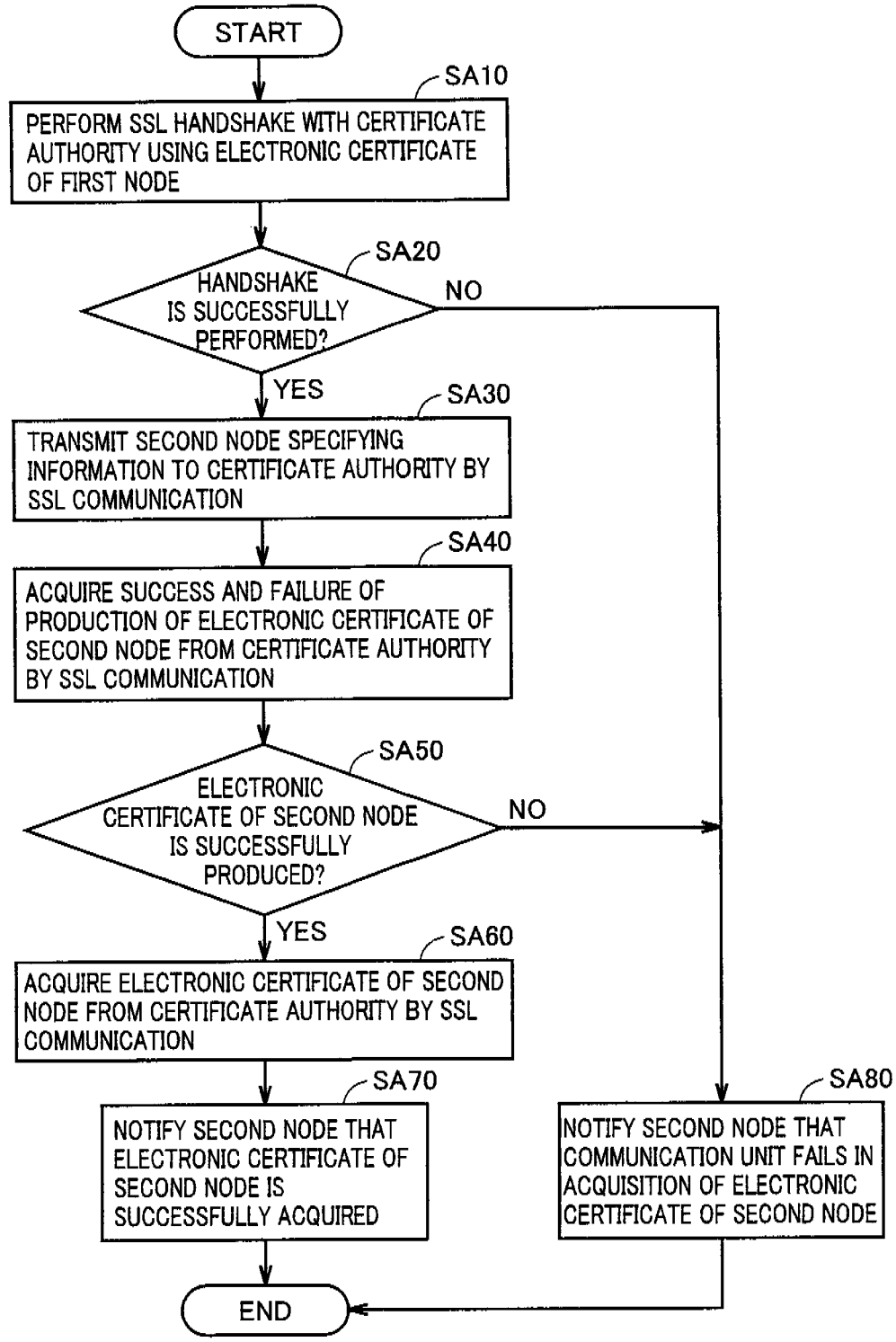
FIG. 6 is a flowchart illustrating pieces of processing that are performed when the first node of FIG. 1 acquires an electronic certificate by proxy.

FIG. 6 is a flowchart illustrating pieces of processing that are performed when first node 101 transmits the certificate issuing request to the certificate authority to acquire the electronic certificate of second node 102 by proxy.

The processing performed by first node 101 will be described below.

Referring to FIG. 6, in Step SA10, communication unit 203 performs the SSL handshake with certificate issuing authority 104 using the electronic certificate of first node 101. The flow goes to processing in Step SA20.

In Step SA20, communication unit 203 determines whether or not the handshake in Step SA10 is successfully performed. The flow goes to processing in Step SA30 when communication unit 203 determines that the handshake is successfully performed, and the flow goes to processing in Step SA80 when communication unit 203 determines that communication unit 203 fails in the handshake.

In Step SA30, communication unit 203 transmits second node specifying information (second node information) stored in management unit 202 to certificate issuing authority 104 by the SSL communication. The flow goes to processing in Step SA40.

In Step SA40, communication unit 203 acquires the success and failure of the production of the electronic certificate of second node 102 from certificate issuing authority 104 by the SSL communication. The flow goes to processing in Step SA50

In Step SA50, communication unit 203 determines whether or not certificate issuing authority 104 succeeds in the production of the electronic certificate of second node 102. The flow goes to processing in Step SA60 when communication unit 203 determines that certificate issuing authority 104 succeeds in the production of the electronic certificate, and the flow goes to processing in Step SA80 when communication unit 203 determines that certificate issuing authority 104 fails in the production of the electronic certificate.

In Step SA60, communication unit 203 acquires the electronic certificate of second node 102 from certificate issuing authority 104 by the SSL communication. The flow goes to processing in Step SA70.

In Step SA70, communication unit 201 notifies second node 102 that communication unit 203 succeeds in the acquisition of the electronic certificate of second node 102. Then the processing is ended.

On the other hand, in Step SA80, communication unit 201 notifies second node 102 that communication unit 203 fails in the electronic certificate of second node 102. Then the processing is ended.

(Communication Mediation Processing in First Node)

Figure 7:
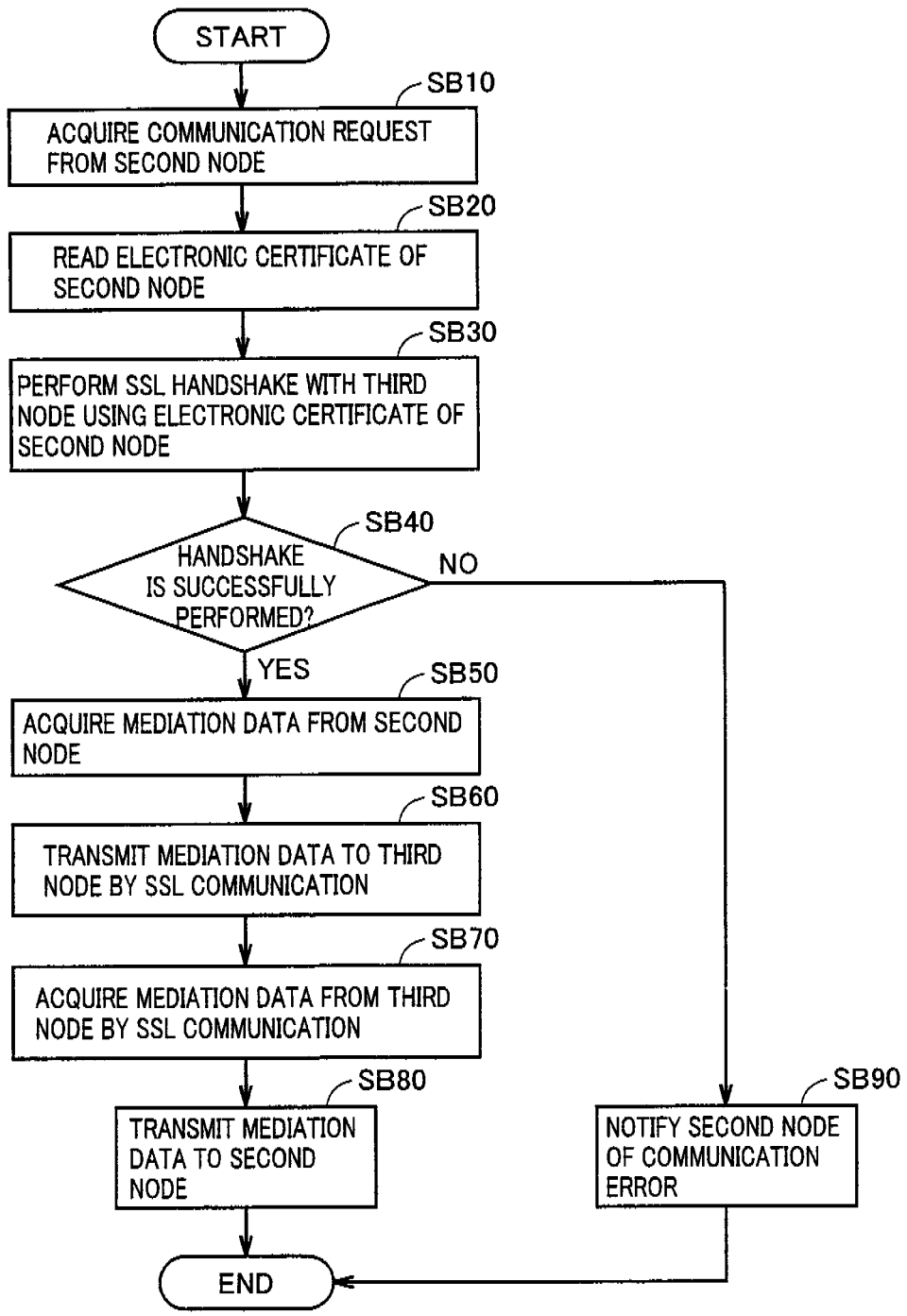
FIG. 7 is a flowchart illustrating pieces of processing that are performed when the first node of FIG. 1 communicates with the third node by proxy of the second node.

FIG. 7 is a flowchart illustrating pieces of processing that are performed when first node 101 mediates the communication between second node 102 and third node 103.

Referring to FIG. 7, when communication unit 201 receives the request for the communication with third node 103 from second node 102 in Step SB10, the flow goes to processing in Step SB20.

In Step SB20, communication unit 207 reads the electronic certificate of second node 102 from management unit 202. The flow goes to processing in Step SB30.

In Step SB30, communication unit 207 performs the SSL handshake with third node 103 using the electronic certificate of second node 102. The flow goes to processing in Step SB40.

In Step SB40, communication unit 207 determines whether or not the handshake with third node 103 is successfully performed. The flow goes to processing in Step SB50 when communication unit 207 determines that the handshake with third node 103 is successfully performed, and the flow goes to processing in Step SB90 when communication unit 207 determines that communication unit 207 fails in the handshake with third node 103.

In Step SB50, communication unit 201 acquires data (mediation data), which should be transmitted to third node 103, from second node 102 and stores the mediation data in mediation information management unit 206. The flow goes to processing in Step SB60.

In Step SB60, communication unit 207 reads the mediation data stored in mediation information management unit 206 and transmits the mediation data to third node 103 by the SSL communication. The flow goes to processing in Step SB70.

In Step SB70, communication unit 207 acquires data (mediation data), which should be transmitted to second node 102, from third node 103 and stores the mediation data in mediation information management unit 206. The flow goes to processing in Step SB80.

In Step SB80, communication unit 201 transmits the mediation data, which is stored in mediation information management unit 206 in Step SB70 and received from third node 103, to second node 102. Then the processing is ended.

In Step SB90, communication unit 201 notifies second node 102 of a communication error. Then the processing is ended.

(Data Flow in Communication System)

In the communication system of first embodiment, first node 101 acquires information (for example, the second node information) specifying second node 102 and make a request to issue the electronic certificate of second node 102 to certificate issuing authority 104 based on the information. In response to the request, certificate issuing authority 104 produces the electronic certificate of second node 102 and transmits the electronic certificate to first node 101.

In the communication system of first embodiment, first node 101 mediates the communication between second node 102 that exists in same network 100 as first node 101 and third node 103 that exists outside of network 100. During the communication mediation, first node 101 communicates with third node 103 using the produced electronic certificate of second node 102. Therefore, even if the communication with second node 102 cannot be conducted using the electronic certificate, the secure communication between second node 102 and third node 103 can be conducted through first node 101 using the electronic certificate of second node 102.

The acquisition of the electronic certificate by proxy and the communication mediation will more specifically be described below with reference to FIGS. 8 to 11.

Figure 8:
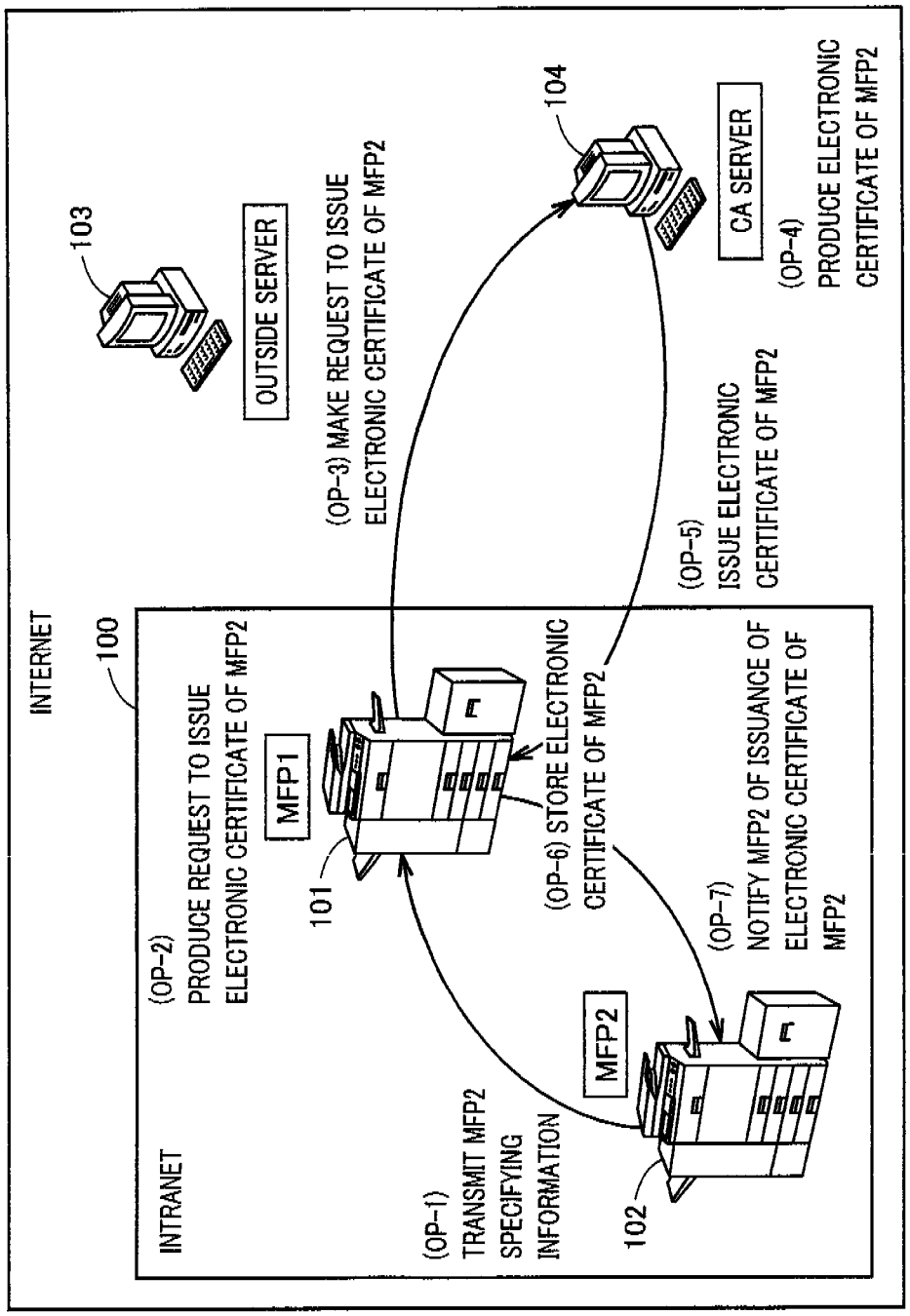
FIG. 8 schematically illustrates a specific example of the communication system of FIG. 1.
Figure 10:
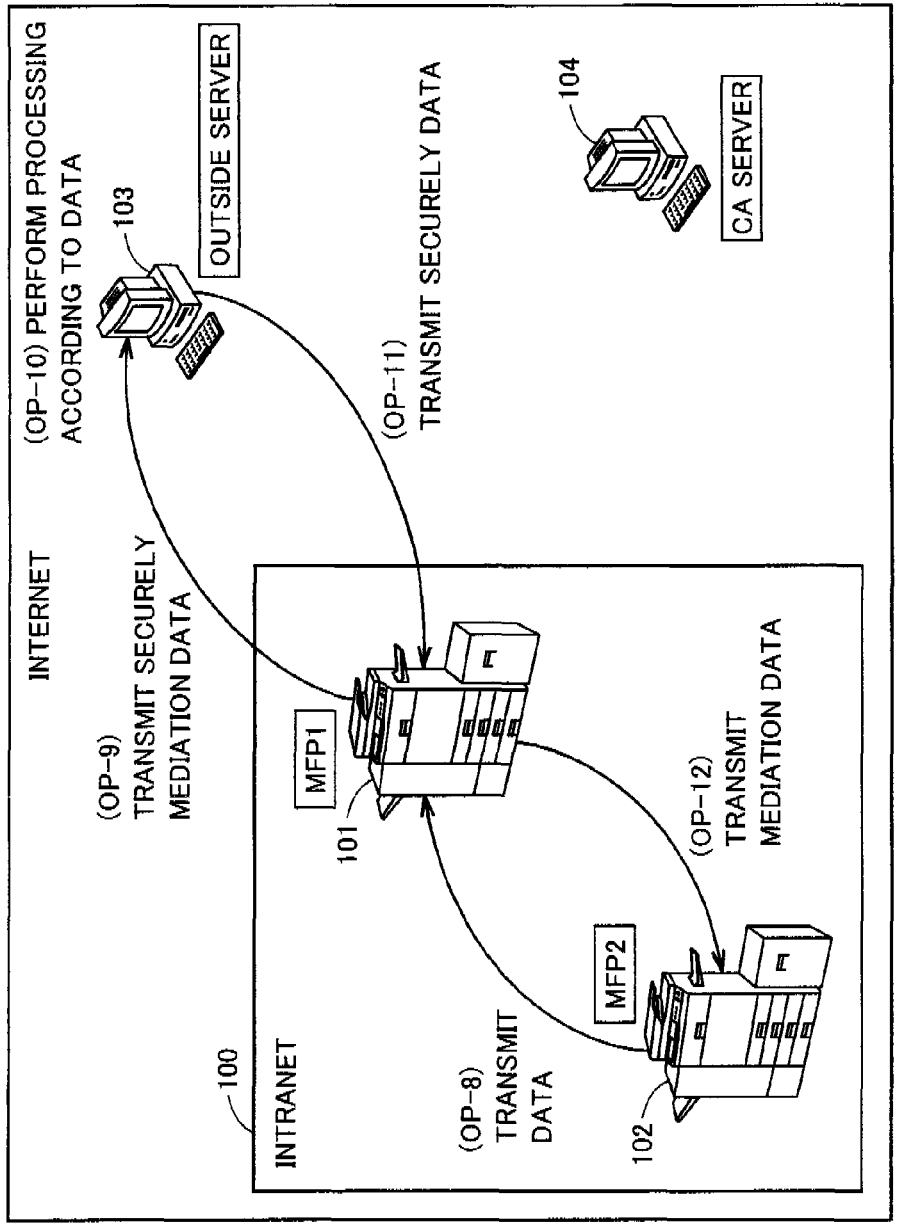
FIG. 10 schematically illustrates a specific example of the communication system of FIG. 1.

FIGS. 8 and 10 schematically illustrate a specific example of the communication system of the first embodiment. In FIGS. 8 and 10, first node 101 and second node 102 are formed by MFPs (Multi Function Peripheral), respectively. Third node 103 is formed by a server (outside server) that exists outside of network 100. Certificate issuing authority 104 is formed by a CA (Certificate Authority) server.

Figure 9:
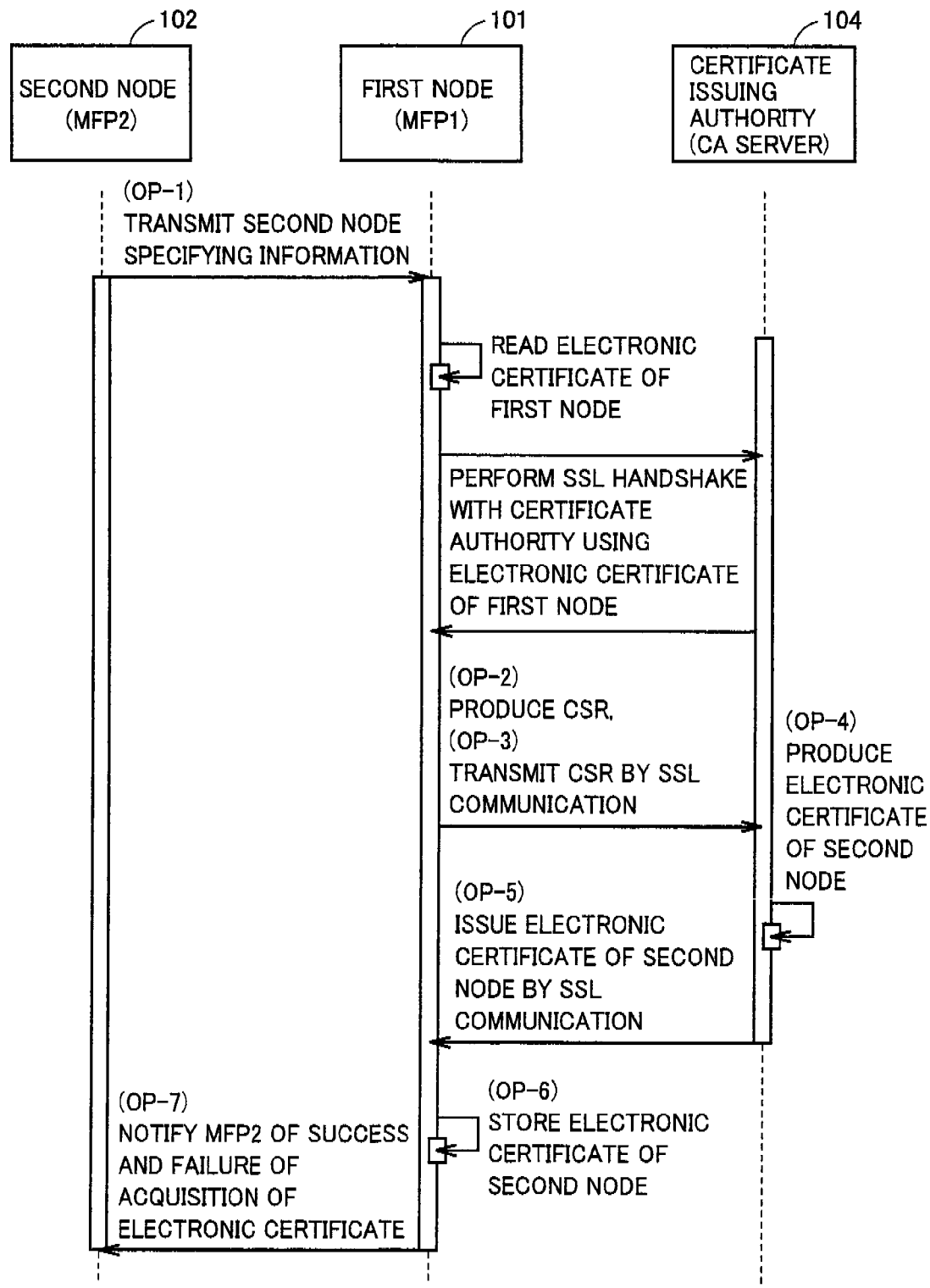
FIG. 9 is a sequence diagram illustrating an example of the acquisition of the electronic certificate by proxy in the specific example of FIG. 8.
Figure 11:
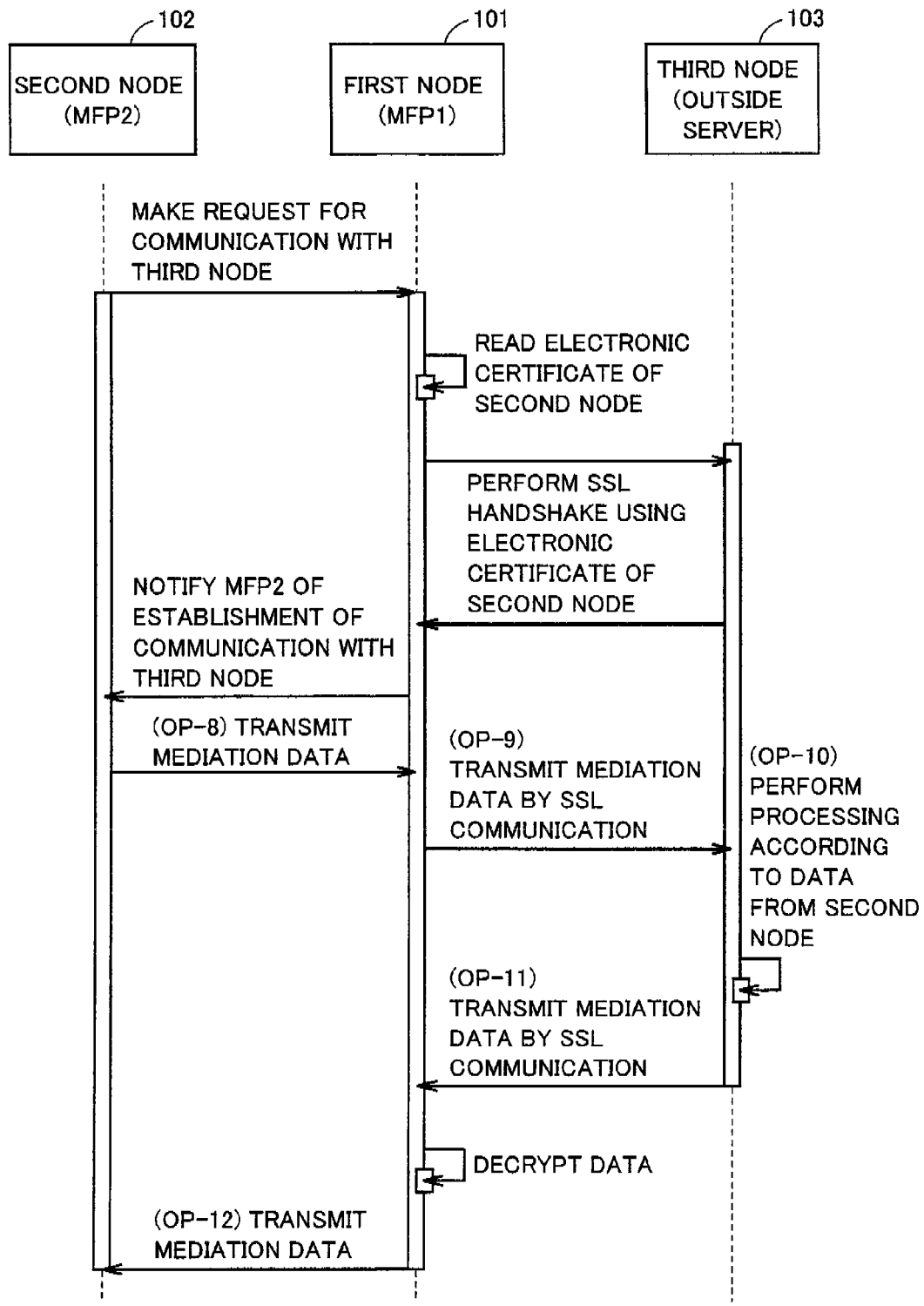
FIG. 11 is a sequence diagram illustrating an example of communication mediation in the specific example of FIG. 10.

FIG. 8 illustrates a data flow during the acquisition of the electronic certificate by proxy. FIG. 10 illustrates a data flow during the communication mediation performed by first node 101. FIG. 9 is a sequence diagram illustrating the acquisition of the electronic certificate by proxy in FIG. 8. FIG. 11 is a sequence diagram illustrating the communication mediation in FIG. 10.

In the following description, for the sake of convenience, first node 101 is referred to as "MFP1", second node 102 is referred to as "MFP2", third node 103 is referred to as "outside server", and certificate issuing authority 104 is referred to as "CA server".

In the following communication system, MFP1 has a function of receiving issuance of the electronic certificate according to on-line issuance of the electronic certificate, and MFP2 does not have the function. That is, MFP1 can securely make a request to issue the electronic certificate on line and acquire the issued electronic certificate from the CA server.

In the first embodiment, even if MFP2 does not have the function of receiving the issuance of the electronic certificate, MFP1 acquires the electronic certificate by proxy of MFP2, and MFP1 mediates the communication between MFP2 and the outside server using the electronic certificate of MFP2, which allows the outside server to transmit and receive the data to and from MFP2 while validity of MFP2 is confirmed. Therefore, information such as maintenance information on MFP2 can be transmitted and received through the secure communication between MFP2 and the outside server that exists outside of network 100.

The CA server has a function of on-line-issuing the electronic certificate, and the CA server securely receives the request to issue the electronic certificate on line and issues the electronic certificate.

<Acquisition of Electronic Certificate by Proxy>

Processes that are performed in elements of the communication system when MFP1 acquires the electronic certificate of MFP2 by proxy will be described with reference to FIGS. 8 and 9.

OP-1

MFP2 transmits information (for example, the second node information) specifying MFP2 to MFP1.

At this point, the transmitted specifying information can include the serial number or MAC address of MFP2 and the secret key or public key public of the key cryptography. When second node 102 is software, the specifying information may be a license key for the software.

The expiration date of the specifying information may be provided in the specifying information.

As to a specific mode in which the expiration date is used, it is considered that the specifying information received from MFP1 is cancelled without making the request to issue the electronic certificate to CA server when the expiration date of MFP1 is expired.

As to another mode in which the expiration date is used, MFP2 produces and encrypts a common key that is temporarily valid only within the expiration date and transmits the encrypted information to MFP1 along with the common key, and MFP1 may decrypt the specifying information only within the expiration date so as to be able to make the request to issue the electronic certificate of MFP2 to the CA server.

As to still another mode in which the expiration date is used, MFP2 produces the secret key and the public key before transmitting the specifying information, and MFP2 transmits the public key to MFP1. MFP2 erases the secret key when the expiration date of the specifying information is expired. When making the request to issue the electronic certificate to the CA server, MFP1 transmits specifying information request data (data making the request to transmit the specifying information to MFP2) encrypted using the public key of MFP2 to MFP2. MFP2 transmits the specifying information to MFP1 after confirming that the specifying information request data can be decrypted using the produced secret key.

OP-2

MFP1 reads the electronic certificate thereof, performs the handshake with certificate issuing authority 104 by the SSL communication, and produces a request (CSR (Certificate Signing Request)) to issue the electronic certificate of MFP2 in response to the transmission of the information from MFP2.

MFP1 can add additional information to the CSR in addition to the usual information making the request to issue the electronic certificate. The additional information includes information specifying the instrument of MFP1 that acts as the proxy and mediation of the communication, the expiration date of the electronic certificate, and the expiration date of the electronic certificate of MFP2.

OP-3

MFP1 transmits the CSR produced in OP-2 to the CA server.

OP-4

When receiving the CSR from MFP1, the CA server produces the electronic certificate of MFP2.

That the CA server successfully authenticates MFP1 may be included on condition that the CA server issues the electronic certificate of MFP2. At this point, in MFP1, instrument specifying information on MFP1 is included as the additional information in the certificate issuing request information. The CA server tries to authenticate MFP1 based on the instrument specifying information.

Alternatively, in performing the SSL handshake between MFP1 and the CA server, MFP1 is authenticated using the electronic certificate of MFP1, which is transmitted to the CA server, and the CA server may issue the electronic certificate of MFP2 subject to the successful authentication on the condition that the CA server successfully authenticates MFP1.

Alternatively, when the CA server produces the electronic certificate of MFP2, the expiration date of the electronic certificate of MFP2 may be set so as to be expired prior to or simultaneously with the expiration date of the electronic certificate of MFP1. In the first embodiment, because the communication in which the electronic certificate of MFP2 is used is conducted through MFP1, MFP1 cannot mediate the communication between MFP2 and the outside server when the expiration date of the electronic certificate of MFP1 is expired. Therefore, the expiration date of the electronic certificate of MFP2 is set equal to or shorter than the expiration date of the electronic certificate of MFP1, which allows the expiration date of the electronic certificate of MFP2 to be prevented from being set uselessly longer.

MFP1 may produce information on the expiration date of the electronic certificate of MFP2 as the additional information to involve the information in the certificate issuing request information transmitted to the CA server. The CA server sets the expiration date of the electronic certificate of MFP2 according to the additional information.

OP-5

The CA server transmits the electronic certificate of MFP2, which is produced in OP-4, to MFP1.

OP-6

MFP1 stores the electronic certificate of MFP2, which is received from the CA server.

OP-7

In response to the reception of the electronic certificate of MFP2 from the CA server, MFP1 notifies MFP2 that the electronic certificate of MFP2 is issued.

When notifying MFP2 that the electronic certificate of MFP2 is issued, MFP1 may distribute a ticket to MFP2. MFP2 transmits the ticket to MFP1 when making the request to mediate the communication with the outside server to MFP1. MFP1 can start the processing of mediating the communication between MFP2 and the outside server subject to the reception of the ticket, that is, subject to the communication mediation request from the instrument (MFP2) that has an electronic certificate acquired by proxy by MFP1.

When notifying MFP2 of the issuance of the electronic certificate, MFP1 may also notify MFP2 of the expiration date of the electronic certificate of MFP2.

<Communication Mediation>

Processes that are performed in elements of the communication system when first node 101 mediates the communication between second node 102 and third node 103 will be described in order with reference to FIGS. 10 and 11.

When receiving the request for the communication with outside server from MFP2, MFP1 reads the electronic certificate of MFP2 and performs the SSL handshake with the outside server using the electronic certificate.

When MFP2 makes the request to mediate the communication with the outside server to MFP1, MFP2 transmits the ticket to MFP1, MFP1 confirms that the communication mediation request is the request from the node (MFP2) of which MFP1 transmits the certificate issuing request to the CA server, and MFP1 may start the communication mediation processing subject to the confirmation.

When MFP2 makes the communication mediation request to MFP1, the IP address or MAC address of MFP and the communication pathway information are transmitted to MFP1, and MFP1 may start the processing (such as the handshake with the outside server) of mediating the communication subject to the confirmation that MFP2 exists on the same network as MFP1.

When the communication with the outside server is established, MFP1 notifies MFP2 of the communication establishment.

OP-8

When receiving the notification of the communication establishment, MFP2 transmits data (mediation data) to be transmitted to the outside server to MFP1.

At this point, the outside server may authenticate MFP1, which mediates the communication, using the instrument specifying information or electronic certificate, which are transmitted from MFP1. That is, in performing the SSL handshake between MFP1 and the CA server, MFP1 transmits the electronic certificate of MFP1 to the CA server, the CA server authenticates MFP1, and the handshake may be performed using the electronic certificate of MFP2 after the authentication of MFP1.

OP-9

MFP1 transmits the data, which is transmitted from MFP2, to the outside server.

OP-10

The outside server receives the data, which is transmitted through MFP1, from MFP2 and performs processing according to the received data.

OP-11

The outside server transmits the data, which is transmitted to MFP2, to MFP1. The outside server can securely communicate with MFP1 using the electronic certificate of the outside server.

OP-12

When receiving data from the outside server, MFP1 transmits the data to MFP2 that exists in an intranet.

MFP2 performs processing according to the received data.

Second Embodiment

Figure 12:
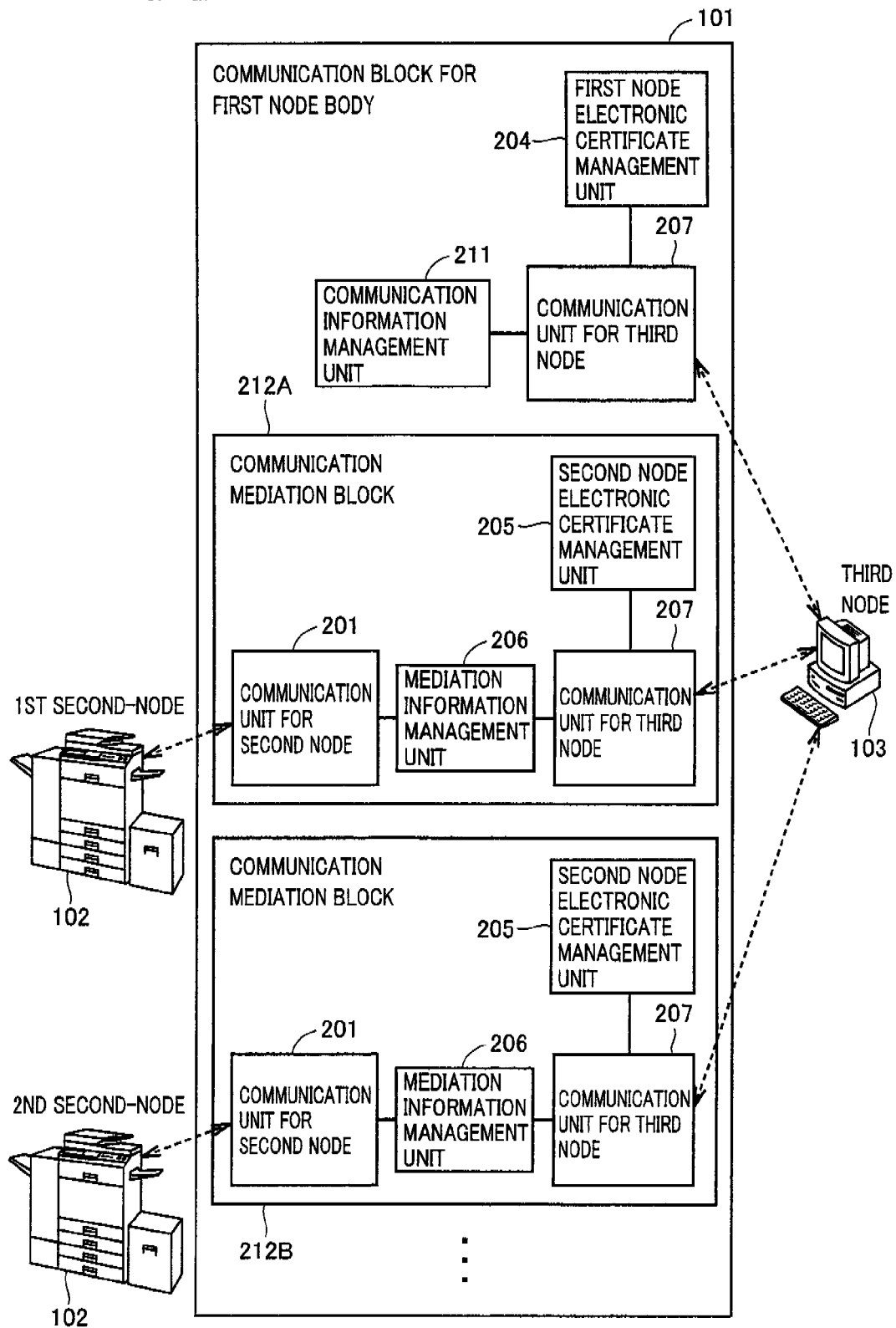
FIG. 12 is a functional block diagram of a first node in a communication system according to a second embodiment of the invention.

In a communication system according to a second embodiment of the invention, similarly to the first embodiment, first node 101 can communicate with the plurality of second nodes 102. FIG. 12 is a functional block diagram schematically illustrating first node 101 of the second embodiment.

Similarly to first node 101 of the first embodiment described with reference to FIG. 2, first node 101 of the second embodiment has first node electronic certificate management unit 204 and communication unit 207 for the third node.

On the other hand, first node 101 of the second embodiment includes a communication mediation block 212 (212A, 212B, . . . ) in each second node 102 that becomes the other end of communication. Each communication mediation block includes communication unit 201 for the second node, mediation information management unit 206, communication unit 207 for the third node, and second node electronic certificate management unit 205. The communication mediation blocks 212 are configured while physically separated from one another. Therefore, in first node 101, communication mediation blocks 212 cannot refer to each other's pieces of data. Accordingly, in the configuration of first node 101, because the portions that communicate with second nodes 102 cannot refer to each other's pieces of data, the security is ensured in the communication with each second node 102.

Although not illustrated in each communication mediation block 212 of FIG. 12, the communication mediation block 212 includes constituents (certificate verifying unit 208, information encrypting unit 209, and information decrypting unit 210) that are used in the encrypted communication.

Third Embodiment

Figure 13:
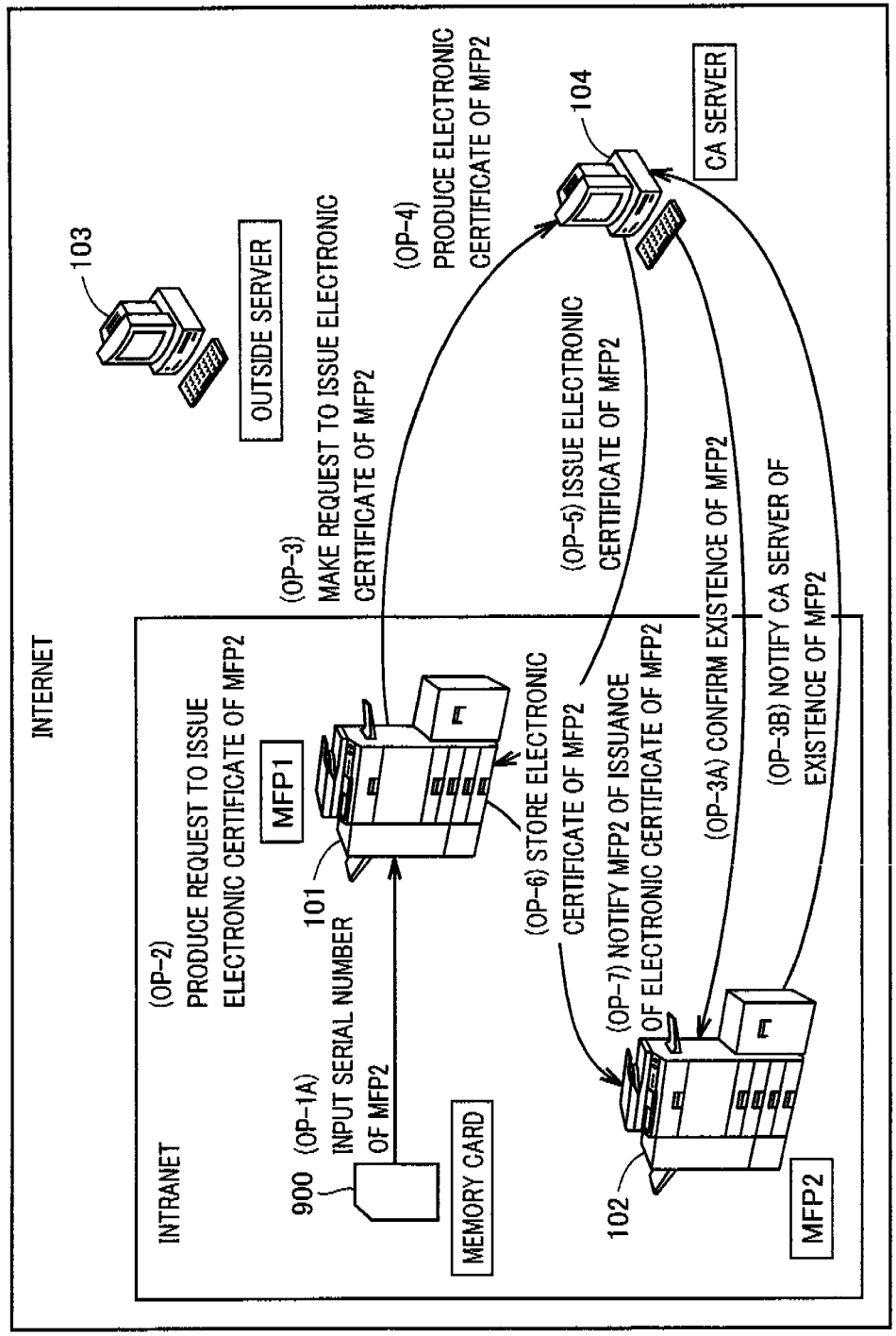
FIG. 13 illustrates contents of the acquisition of the electronic certificate by proxy in a communication system according to a third embodiment of the invention.

In a communication system according to a third embodiment of the invention, the processing is changed in issuing the electronic certificate of second node 102 compared with the first embodiment. Processes that are performed when first node 101 of the third embodiment acquires the electronic certificate of second node 102 by proxy will be described below with reference to FIG. 13.

OP-1A

In the third embodiment, MFP1 includes the input device. In the input device, information recorded in a recording medium 900 that is detachably attached to MFP1 can be read or the operation can externally be input with the keyboard or operation panel.

MFP1 reads the information that is recorded in recording medium 900 or input to the input device through the input device, thereby acquiring the information (for example, the second node information) specifying MFP2.

OP-2

Similarly to OP-2 of the first embodiment, MFP1 reads the electronic certificate of MFP1, performs the SSL handshake with certificate issuing authority 104, and produces the request (CSR) to issue the electronic certificate of MFP2 in response to the information transmitted from MFP2. The CSR can include the additional information in addition to the usual information making the request to issue the electronic certificate.

OP-3

MFP1 transmits the CSR produced in OP-2 to the CA server.

OP-3A

When receiving the CSR, the CA server performs processing of confirming the existence of MFP2. The processing of confirming the existence means that encrypted data is transmitted to MFP2 by the electronic mail or HTTP communication.

OP-3B

MFP2 notifies the CA server of the existence thereof. The notification means that MFP2 transmits the data, which is encrypted by the same method as the encrypted data transmitted from the CA server, to the CA server by the electronic mail or HTTP communication.

OP-4

When receiving the existence notification from MFP2, the CA server produces the electronic certificate of MFP2 similarly to OP-4 of the first embodiment.

OP-5

The CA server transmits the electronic certificate of MFP2, which is produced in OP-4, to MFP1 similarly to OP-5 of the first embodiment.

OP-6

Similarly to OP-6 of the first embodiment, MFP1 stores the electronic certificate of MFP2, which is received from the CA server.

OP-7

Similarly to OP-7 of the first embodiment, MFP1 notifies MFP2 that the electronic certificate of MFP2 is issued in response to the reception of the electronic certificate of MFP2 from the CA server.

Fourth Embodiment

In the first embodiment, the electronic certificate of second node 102 is stored in second node information management unit 202 of first node 101. On the other hand, in a fourth embodiment, second node 102 can store the electronic certificate of second node 102 therein. Changes in the communication system of the fourth embodiment with respect to the communication system of the first embodiment will be described below.

Figure 14:
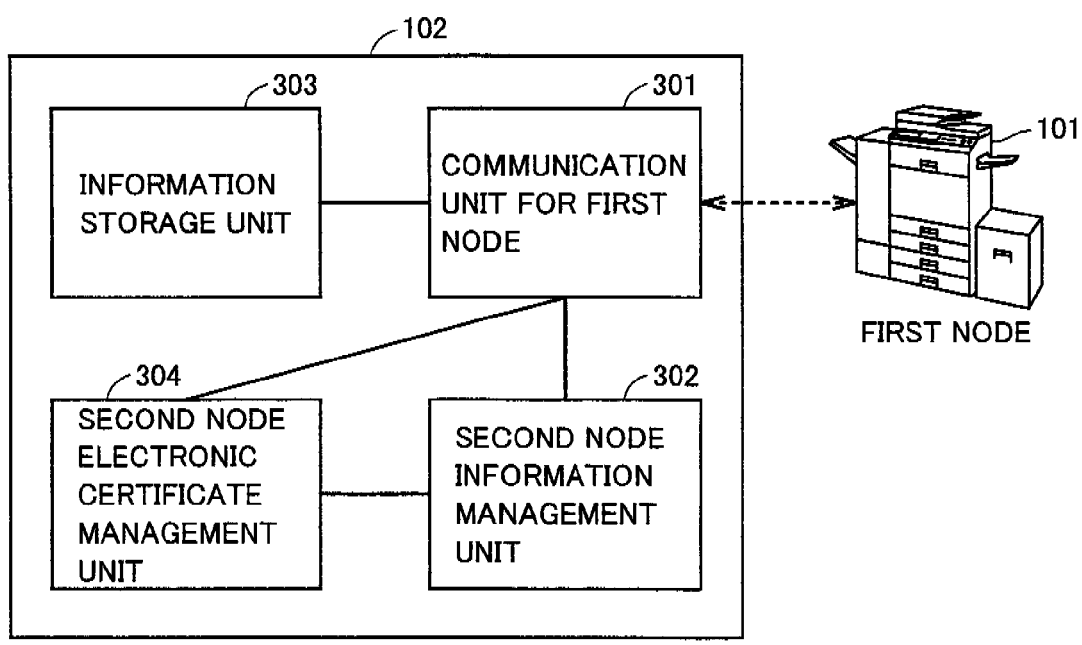
FIG. 14 is a functional block diagram of a second node in a communication system according to a fourth embodiment of the invention.

FIG. 14 is a functional block diagram illustrating second node 102 of the fourth embodiment.

Second node 102 of the fourth embodiment includes a second node electronic certificate management unit 304 (hereinafter simply referred to as "management unit 304") in addition to second node 102 of the first embodiment.

In the fourth embodiment, after acquiring the electronic certificate of second node 102 by proxy, first node 101 transmits the electronic certificate to second node 102. In second node 102, the received electronic certificate is stored in management unit 304.

When making the request to mediate the communication with third node 103 to first node 101, second node 102 transmits the communication mediation request and the electronic certificate of second node 102 to first node 101. When receiving the electronic certificate of second node 102 from second node 102, first node 101 stores the electronic certificate of second node 102 in management unit 202, and first node 101 mediates the communication between second node 102 and third node 103 using the electronic certificate of second node 102 similarly to the first embodiment.

In the fourth embodiment, preferably first node 101 erases the electronic certificate of second node 102 from management unit 202 after transmitting the electronic certificate acquired from certificate issuing authority 104 to second node 102.

Second node 102 can set the expiration date of the electronic certificate of second node 102, which is transmitted along with the communication mediation request, when the electronic certificate of second node 102 is stored in management unit 202. In first node 101, when the expiration date is expired, the electronic certificate is erased from management unit 202.

The electronic certificate of second node 102 may be stored in another instrument except first node 101 and second node 102 in network 100 when a storage area of an extent in which the electronic certificate is stored cannot be ensured in second node 102. At this point, second node 102 makes a request to transmit the electronic certificate of second node 102 to first node 101 to the instrument while transmitting the communication mediation request to first node 101. The instrument transmits the electronic certificate of second node 102 to first node 101 in response to the request.

Figure 15:
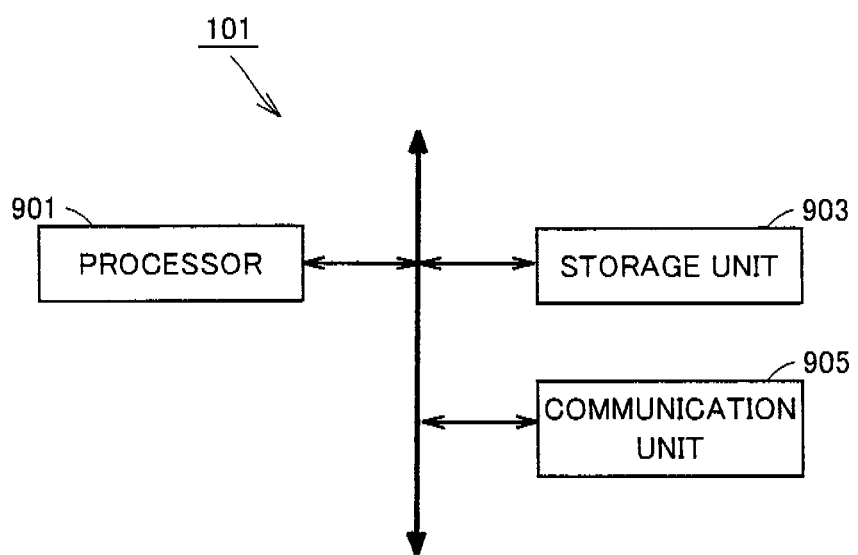
FIG. 15 illustrates an example of a hardware configuration of the first node.

FIG. 15 illustrates an example of a hardware configuration of first node 101. First node 101 includes a processor 901, a storage unit 903 and a communication unit 905. Processor 901 includes a CPU and realizes certificate verifying unit 208, information encrypting unit 209 and information decrypting unit 210. Storage unit 903 is configured by a storage device and realizes information management unit 202, management unit 204, management unit 205, and management unit 206. Communication unit 905 realizes the communication function of communication unit 201 and the like. Communication unit 905 is, for example, a LAN (Local Area Network) adapter. Communication unit 201, communication unit 203 and communication unit 207 may be realized by one communication unit 905.

Although the present invention has been described and illustrated in detail, it is clearly understood that the same is by way of illustration and example only and is not to be taken by way of limitation, the scope of the present invention being interpreted by the term of the appended claims.

What is claimed is:

1. A communication apparatus, acting as a first node, comprising:
    a hardware communication unit, comprising a hardware processor that is configured to:
    (a) transmit a request to a certificate authority, requesting an electronic certificate of a second node,
    (b) receive a response from the certificate authority, wherein the response includes the electronic certificate of the second node, (c) subsequent to receiving the electronic certificate of the second node during step (b), receive a request from the second node to establish communication with a third node, and (d) communicate with the third node on behalf of the second node, by using the electronic certificate of the second node received from the certificate authority during step (b).

2. The communication apparatus according to claim 1, wherein the communication unit is further configured to transmit information specifying the second node to the certificate authority in order to make the request to issue the electronic certificate of the second node.

3. The communication apparatus according to claim 2, wherein the information specifying the second node includes a serial number, a Media Access Control address, and a secret key or a public key by public key cryptography of the second node.

4. The communication apparatus according to claim 2, wherein the communication unit is further configured to acquire the information specifying the second node from the second node through the first communication unit or from an external storage device.

5. The communication apparatus according to claim 2, wherein the information specifying the second node includes an expiration date in which the communication unit is permitted to make the request to issue the electronic certificate of the second node.

6. The communication apparatus according to claim 1, wherein the communication unit is further configured to acquire an electronic certificate of the communication apparatus from the certificate authority, and the communication unit further includes a setting unit configured to set an expiration date of the electronic certificate of the second node such that the expiration date of the electronic certificate of the second node expires prior to an expiration date of the electronic certificate of the communication apparatus.

7. The communication apparatus according to claim 1, wherein the communication unit is further configured to acquire an electronic certificate of the communication apparatus from the certificate authority, and the communication unit transmits information specifying the second node to the certificate authority in order to make the request to issue the electronic certificate of the second node.

8. The communication apparatus according to claim 1, wherein the communication unit is further configured to transmit information making the request to issue the electronic certificate of the second node to the certificate authority after Secure Sockets Layer handshake with the certificate authority.

9. The communication apparatus according to claim 1, wherein the communication unit is further configured to communicate with the third node by public key cryptography using the electronic certificate of the second node.

10. A communication method performed in a communication apparatus, acting as a first node, that communicates with a certificate authority, a second node and a third node, the communication method comprising the steps of:

(a) making a request to issue an electronic certificate for the second node to a certificate authority;

(b) acquiring the electronic certificate of the second node, the electronic certificate of the second node being issued by the certificate authority;

(c) subsequent to receiving the electronic certificate of the second node during step (b), receiving a request for communication with the third node from the second node; and (d) communicating with the third node on behalf of the second node, by using the electronic certificate of the second node received from the certificate authority during step (b).

11. A non-transitory computer-readable recording medium in which a program is recorded, the program being able to be executed by a computer, acting as a first node, in order to communicate with a certificate authority, a second node and a third node, wherein the program includes a program code that causes the computer to perform the steps of:

(a) making a request to issue an electronic certificate for the second node to a certificate authority;

(b) acquiring the electronic certificate of the second node, the electronic certificate of the second node being issued by the certificate authority;

(c) subsequent to receiving the electronic certificate of the second node during step (b), receiving a request for communication with the third node from the second node; and (d) communicating with the third node on behalf of the second node, by using the electronic certificate of second node received from the certificate authority during step (b).

12. A communication system comprising:
a communication apparatus, acting as a first node,
a second node,
a third node, and
a certificate authority,
wherein
the communication apparatus includes a communication unit, comprising a processor that is configured to:
make a request to the certificate authority,
the certificate authority is configured to transmit the electronic certificate of the second node to the communication unit based on the request received from the communication unit,
the communication unit is configured to acquire the electronic certificate of the second node issued by the certificate authority, and
subsequent to receiving the electronic certificate of the second node, the communication unit is further configured to communicate with the third node on behalf of the second node by using the electronic certificate of the second node received from the certificate authority, in response to a reception of a request for communication with the third node from the second node.

13. The communication system according to claim 12, wherein the communication unit is further configured to transmit information specifying the second node to the certificate authority in order to make the request to issue the electronic certificate of the second node.

14. The communication system according to claim 13, wherein the information specifying the second node includes a serial number, a Media Access Control address, and a secret key or a public key by public key cryptography of the second node.

15. The communication system according to claim 13, wherein the communication unit is further configured to acquire the information specifying the second node from the second node through the communication unit or from an external storage device.

16. The communication system according to claim 13 wherein the information specifying the second node includes an expiration date in which the communication unit is permitted to make the request to issue the electronic certificate of the second node.

17. The communication system according to claim 12, wherein the communication unit is further configured to acquire an electronic certificate of the communication apparatus from the certificate authority, and the communication unit further includes a setting unit that is configured to set an expiration date of the electronic certificate of the second node such that the expiration date of the electronic certificate of the second node expires prior to an expiration date of the electronic certificate of the communication apparatus.

18. The communication system according to claim 12, wherein the communication unit is further configured to acquire an electronic certificate of the communication apparatus from the certificate authority, and the communication unit transmits information specifying the second node to the certificate authority in order to make the request to issue the electronic certificate of the second node.

19. The communication system according to claim 12, wherein the communication unit is further configured to transmit information making the request to issue the electronic certificate of the second node to the certificate authority after Secure Sockets Layer handshake with the certificate authority.

20. The communication system according to claim 12, wherein the communication unit is further configured to communicate with the third node by public key cryptography using the electronic certificate of the second node.

* * * * *